United States Patent
Jang et al.

(10) Patent No.: US 10,683,394 B2
(45) Date of Patent: Jun. 16, 2020

(54) POLYIMIDE-BASED BLOCK COPOLYMER FILM

(71) Applicant: LG CHEM, LTD., Seoul (KR)

(72) Inventors: Duk Hun Jang, Daejeon (KR); Byung Guk Kim, Daejeon (KR); Young Sik Eom, Daejeon (KR); Sung Yeol Choi, Daejeon (KR); Sang Gon Kim, Daejeon (KR); Hyung Sam Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 5 days.

(21) Appl. No.: 16/091,269

(22) PCT Filed: Nov. 14, 2017

(86) PCT No.: PCT/KR2017/012888
§ 371 (c)(1),
(2) Date: Oct. 4, 2018

(87) PCT Pub. No.: WO2018/093118
PCT Pub. Date: May 24, 2018

(65) Prior Publication Data
US 2019/0153159 A1      May 23, 2019

(30) Foreign Application Priority Data

Nov. 17, 2016  (KR) .................. 10-2016-0153523
Nov. 13, 2017  (KR) .................. 10-2017-0150902

(51) Int. Cl.
| C08G 73/10 | (2006.01) |
| C08J 5/18 | (2006.01) |
| C08G 73/14 | (2006.01) |
| C09D 179/08 | (2006.01) |

(52) U.S. Cl.
CPC ..... *C08G 73/1067* (2013.01); *C08G 73/1028* (2013.01); *C08G 73/1039* (2013.01); *C08G 73/1042* (2013.01); *C08G 73/14* (2013.01); *C08J 5/18* (2013.01); *C09D 179/08* (2013.01); *C08J 2379/08* (2013.01)

(58) Field of Classification Search
CPC .............. C07D 209/48; C07D 307/89; C08G 73/1053; C08G 73/1067
See application file for complete search history.

(56) References Cited

U.S. PATENT DOCUMENTS

| 2005/0281729 A1* | 12/2005 | Suzuki ................ G01N 27/404 423/445 R |
| 2012/0296050 A1 | 11/2012 | Cho et al. |
| 2014/0031499 A1 | 1/2014 | Cho et al. |
| 2014/0243482 A1 | 8/2014 | Park et al. |
| 2014/0296362 A1 | 10/2014 | Kim et al. |
| 2015/0057427 A1 | 2/2015 | Cho et al. |
| 2015/0299392 A1 | 10/2015 | Park et al. |

FOREIGN PATENT DOCUMENTS

| EP | 0 381 621 A2 | 8/1990 |
| EP | 3375806 A1 | 9/2018 |
| JP | 5908657 B2 | 4/2016 |
| KR | 10-0688912 B1 | 2/2007 |
| KR | 10-2013-0029129 A | 3/2013 |
| KR | 10-2013-0124213 A | 11/2013 |
| KR | 10-2014-0016199 A | 2/2014 |
| KR | 10-1459178 B1 | 11/2014 |
| KR | 10-2015-0025517 A | 3/2015 |
| KR | 10-1523730 B1 | 5/2015 |
| KR | 10-2015-0113472 A | 10/2015 |
| KR | 10-2016-0059097 A | 5/2016 |
| KR | 10-2016-0082639 A | 7/2016 |
| KR | 10-2018-0003436 A | 1/2018 |
| KR | 10-2018-0055564 A | 5/2018 |

OTHER PUBLICATIONS

European Search Report issued for European Patent Application No. 17871699.9 dated Mar. 20, 2019, 6 pages.
Search Report & Written Opinion issued for PCT Application No. PCT/KR2017/012888 dated Mar. 14, 2018, 13 pages.
D. J. Skrovanek, et al., "Hydrogen bonding in polymers: infrared temperature studies of an amorphous polyamide," Macromolecules 1985, 18 (9), 1676-1683.
C. Liu et al., "Synthesis of soluble and autophotosensitive hyperbranched polyimides with good optical properties and thermal properties," Polymer Journal (2013), 45, 318-325.

* cited by examiner

*Primary Examiner* — Kuo Liang Peng
(74) *Attorney, Agent, or Firm* — Rothwell, Figg, Ernst & Manbeck, P.C.

(57) ABSTRACT

The present disclosure relates to a polyimide-based block copolymer film. The polyimide-based block copolymer film according to the present disclosure exhibits excellent an ultraviolet shielding property to be suitably used for substrates for displays, protective films for displays, touch panels, and the like.

9 Claims, 2 Drawing Sheets

[FIG. 1]
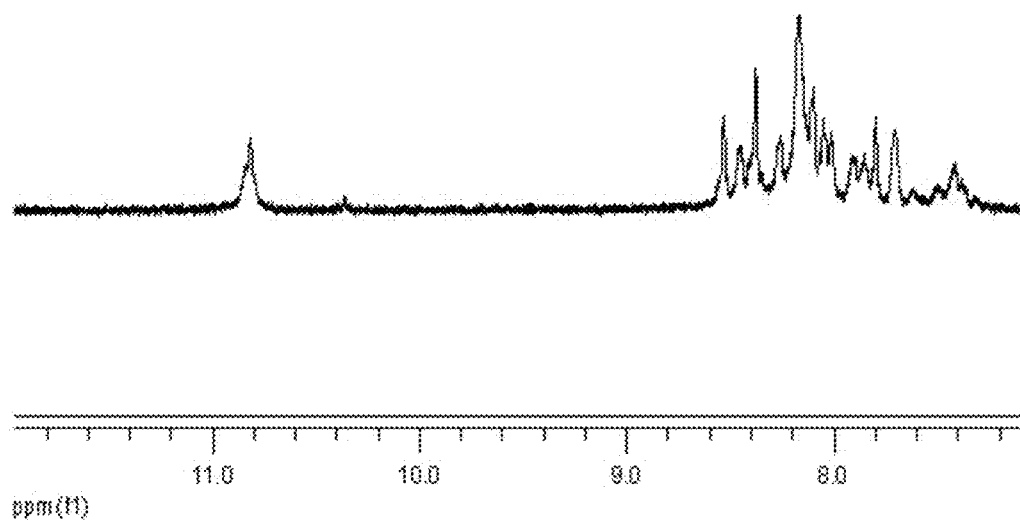
[FIG. 2]
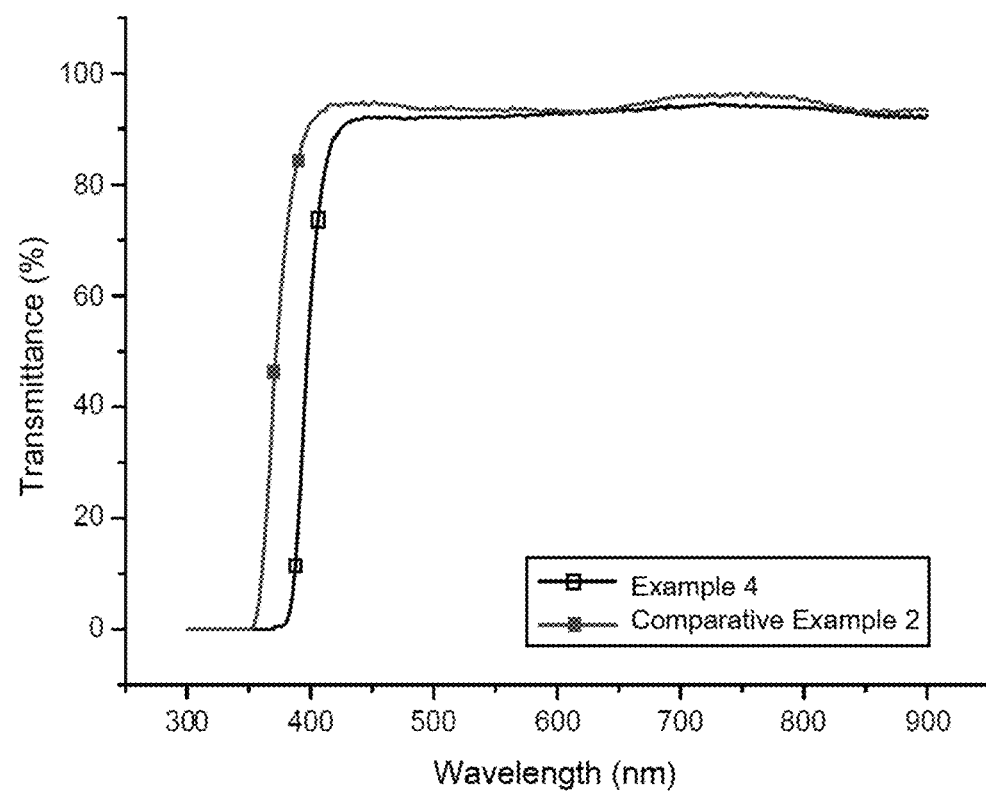

[FIG. 3]
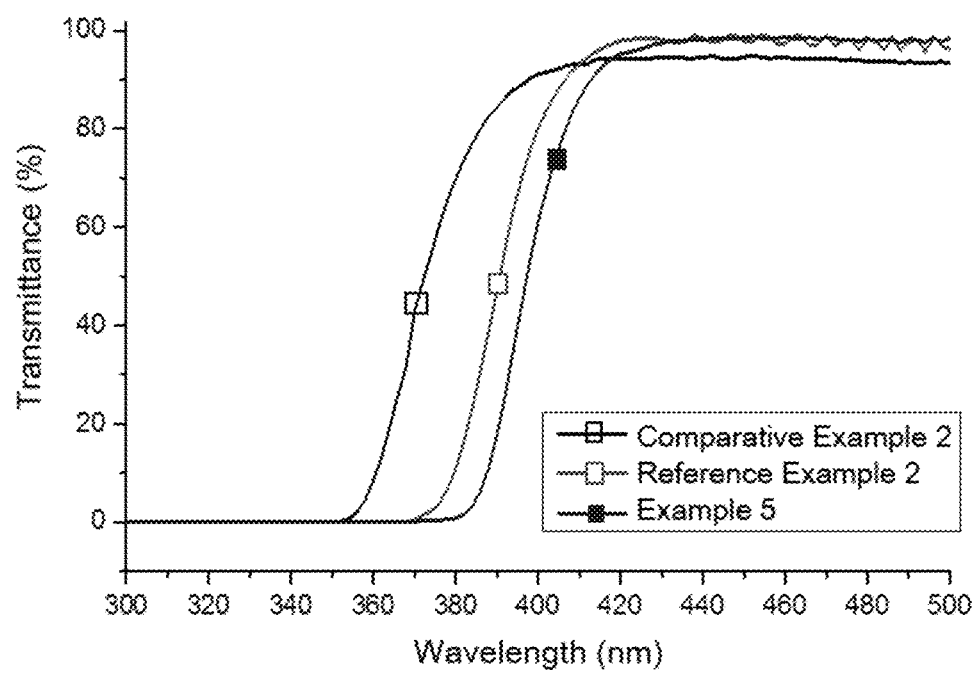

POLYIMIDE-BASED BLOCK COPOLYMER FILM

CROSS-REFERENCE TO RELATED APPLICATION

This application is a 35 U.S.C. § 371 National Phase Entry Application from PCT/KR2017/012888, filed on Nov. 14, 2017, and designating the United States, which claims the benefit of Korean Patent Applications No. 10-2016-0153523 filed on Nov. 17, 2016 and No. 10-2017-0150902 filed on Nov. 13, 2017 with the Korean Intellectual Property Office, the disclosures of which are incorporated herein by reference in their entirety.

TECHNICAL FIELD

The present disclosure relates to a polyimide-based block copolymer film.

BACKGROUND OF ART

An aromatic polyimide resin is a polymer mostly having an amorphous structure, and exhibits excellent heat resistance, chemical resistance, electrical properties, and dimensional stability due to its rigid chain structure. The polyimide resin is widely used as an electric/electronic material.

However, the polyimide resin has many limitations in use, because it is dark brown due to the formation of a CTC (charge transfer complex) of π electrons present in the imide chain.

In order to solve the limitations and obtain a colorless transparent polyimide resin, a method of restricting the movement of the π electrons by introducing a strong electron attracting group such as a trifluoromethyl ($-CF_3$) group, a method of reducing the formation of the CTC by introducing a sulfone ($-SO_2-$) group, an ether ($-O-$) group, or the like into the main chain to make a bent structure, or a method of inhibiting the formation of the resonance structure of the π electrons by introducing an aliphatic cyclic compound, has been proposed.

However, it is difficult for the polyimide resin according to the proposals to exhibit sufficient heat resistance due to the bending structure or the aliphatic cyclic compound, and a film prepared using the same still has limitations such as poor mechanical properties.

DETAILED DESCRIPTION OF THE INVENTION

Technical Problem

The present disclosure is to provide a polyimide-based block copolymer film exhibiting excellent mechanical properties while being colorless and transparent.

Technical Solution

The present disclosure provides a polyimide-based block copolymer film including
a first repeating unit represented by Chemical Formula 1 and a second repeating unit represented by Chemical Formula 2,
wherein transmittance is 13% or less with respect to ultraviolet light having a wavelength of 388 nm at a thickness of 50±5 μm:

[Chemical Formula 1]

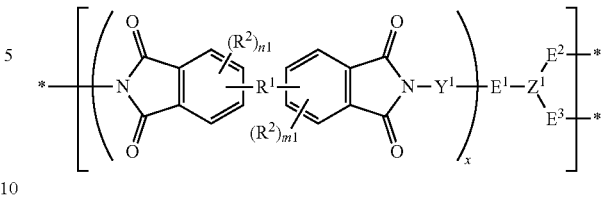

wherein, in Chemical Formula 1,
each $R^1$ is the same as or different from each other in each repeating unit, and each is independently a single bond, $-O-$, $-S-$, $-C(=O)-$, $-CH(OH)-$, $-S(=O)_2-$, $-Si(CH_3)_2-$, $-(CH_2)_p-$ (wherein 1≤p≤10), $-(CF_2)_q-$ (wherein 1≤q≤10), $-C(CH_3)_2-$, $-C(CF_3)_2-$, $-C(=O)NH-$, or a C6 to C30 aromatic organic group;
each $R^2$ is independently $-H$, $-F$, $-Cl$, $-Br$, $-I$, $-CF_3$, $-CCl_3$, $-CBr_3$, $-Cl_3$, $-NO_2$, $-CN$, $-COCH_3$, $-CO_2C_2H_5$, a silyl group containing three C1 to C10 aliphatic organic groups, a C1 to C10 aliphatic organic group, or a C6 to C20 aromatic organic group;
n1 and m1 are independently 0 to 3;
each $Y^1$ is the same as or different from each other in each repeating unit, and each independently includes a C6 to C30 aromatic organic group, and the aromatic organic group exists alone, or two or more aromatic organic groups are bonded to each other to form a condensed ring, or two or more aromatic organic groups are linked by a single bond, a fluorenyl group, $-O-$, $-S-$, $-C(=O)-$, $-CH(OH)-$, $-S(=O)_2-$, $-Si(CH_3)_2-$, $-(CH_2)_p-$ (wherein 1≤p≤10), $-(CF_2)_q-$ (wherein 1≤q≤10), $-C(CH_3)_2-$, $-C(CF_3)_2-$, or $-C(=O)NH-$;
x is an integer of 2 or more, and each repeating unit which is repeated two or more times by x may be the same as or different from each other;
$E^1$, $E^2$, and $E^3$ are independently a single bond, $-NH-$, or $-C(=O)-$; and
each $Z^1$ is the same as or different from each other in each repeating unit, and each is independently a trivalent linking group derived from at least one compound selected from the group consisting of triacyl halide, tricarboxylic acid, and tricarboxylate;

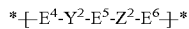 [Chemical Formula 2]

wherein, in Chemical Formula 2,
each $Y^2$ is the same as or different from each other in each repeating unit, and each independently includes a C6 to C30 aromatic organic group, and the aromatic organic group exists alone, or two or more aromatic organic groups are bonded to each other to form a condensed ring, or two or more aromatic organic groups are linked by a single bond, a fluorenyl group, $-O-$, $-S-$, $-C(=O)-$, $-CH(OH)-$, $-S(=O)_2-$, $-Si(CH_3)_2-$, $-(CH_2)_p-$ (wherein 1≤p≤10), $-(CF_2)_q-$ (wherein 1≤q≤10), $-C(CH_3)_2-$, $-C(CF_3)_2-$, or $-C(=O)NH-$;
$E^4$, $E^5$, and $E^6$ are independently a single bond, $-NH-$, or $-C(=O)-$; and
each $Z^2$ is the same as or different from each other in each repeating unit, and each is independently a divalent linking group derived from at least one compound selected from the group consisting of diacyl halide, dicarboxylic acid, and dicarboxylate.

Hereinafter, the polyimide-based block copolymer and the polyimide-based film including the same according to the exemplary embodiments of the present disclosure will be described in more detail.

In this specification, the terms are used merely to refer to specific embodiments, and are not intended to restrict the present disclosure unless it is explicitly expressed.

Singular expressions of the present disclosure may include plural expressions unless it is differently expressed contextually.

The terms "include", "comprise", and the like of the present disclosure are used to specify certain features, regions, integers, steps, operations, elements, and/or components, and these do not exclude the existence or the addition of other certain features, regions, integers, steps, operations, elements, and/or components.

Also, the terms including ordinal numbers such as "first" and "second" are used to distinguish one component from another, and the components are not limited by the ordinal number. For example, within the scope of the present invention, the first component may also be referred to as a second component, and similarly, the second component may be referred to as a first component.

As a result of further studies by the present inventors, it was confirmed that the polyimide-based block copolymer in which a brancher having three reactive substituents is introduced into a linear polyimide chain and two or more tetracarboxylic acid anhydrides are applied to be block copolymerized has an excellent ultraviolet shielding property while being colorless and transparent.

The brancher may impart a network structure to the copolymer. By the block copolymerization of the repeating units containing the brancher, a network having a rigid and stable structure may be formed in the copolymer.

Specifically, the polyimide-based block copolymer including the first repeating unit formed by applying two or more tetracarboxylic acid anhydrides together with a brancher may have a long polymer chain and a stable network compared with the linear type of polyimide-based copolymer, thereby exhibiting a significantly improved ultraviolet shielding property.

As a result, the polyimide-based block copolymer film can be suitably used as a base material for devices and apparatuses which require colorless transparency as well as an excellent ultraviolet shielding property. For example, such a polyimide-based block copolymer film can be suitably used for substrates for displays, protective films for displays, touch panels, and the like, and especially for various foldable devices and apparatuses.

According to one embodiment of the present disclosure, a polyimide-based block copolymer film including a first repeating unit represented by Chemical Formula 1 and a second repeating unit represented by Chemical Formula 2, wherein transmittance is 13% or less with respect to ultraviolet light having a wavelength of 388 nm at a thickness of 50±5 μm, is provided:

[Chemical Formula 1]

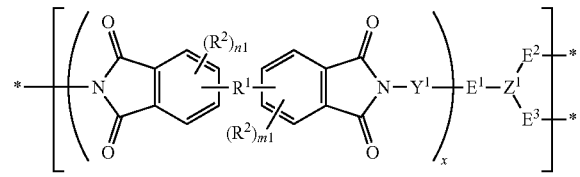

wherein, in Chemical Formula 1, each $R^1$ is the same as or different from each other in each repeating unit, and each is independently a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, —C(=O)NH—, or a C6 to C30 aromatic organic group;

each $R^2$ is independently —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group;

n1 and m1 are independently 0 to 3;

each $Y^1$ is the same as or different from each other in each repeating unit, and each independently includes a C6 to C30 aromatic organic group, and the aromatic organic group exists alone, or two or more aromatic organic groups are bonded to each other to form a condensed ring, or two or more aromatic organic groups are linked by a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—;

x is an integer of 2 or more, and each repeating unit which is repeated two or more times by x may be the same as or different from each other;

$E^1$, $E^2$, and $E^3$ are independently a single bond, —NH—, or —C(=O)—; and each $Z^1$ is the same as or different from each other in each repeating unit, and each is independently a trivalent linking group derived from at least one compound selected from the group consisting of triacyl halide, tricarboxylic acid, and tricarboxylate;

$$*\text{-}[\text{-}E^4\text{-}Y^2\text{-}E^5\text{-}Z^2\text{-}E^6\text{-}]\text{-}*$$  [Chemical Formula 2]

wherein, in Chemical Formula 2, each $Y^2$ is the same as or different from each other in each repeating unit, and each independently includes a C6 to C30 aromatic organic group, and the aromatic organic group exists alone, or two or more aromatic organic groups are bonded to each other to form a condensed ring, or two or more aromatic organic groups are linked by a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—;

$E^4$, $E^5$, and $E^6$ are independently a single bond, —NH—, or —C(=O)—; and each $Z^2$ is the same as or different from each other in each repeating unit, and each is independently a divalent linking group derived from at least one compound selected from the group consisting of diacyl halide, dicarboxylic acid, and dicarboxylate.

The polyimide-based block copolymer film of the present disclosure includes a first repeating unit represented by Chemical Formula 1 and a second repeating unit represented by Chemical Formula 2.

(i) First Repeating Unit of Polyimide-Based Block Copolymer

[Chemical Formula 1]

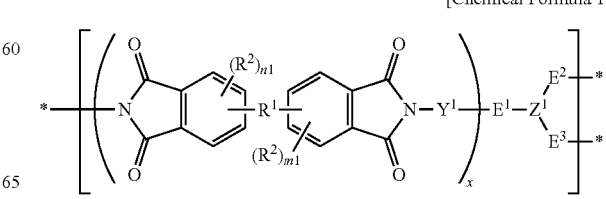

In the first repeating unit of Chemical Formula 1, each $R^1$ is the same as or different from each other in each repeating unit, and each is independently a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, —C(=O)NH—, or a C6 to C30 aromatic organic group.

Here, the single bond means a case that $R^1$ in Chemical Formula 1 is a chemical bond which simply links the groups on both sides.

Further, the C6 to C30 aromatic organic group may exist alone; two or more aromatic organic groups may be bonded to each other to form a condensed ring; or two or more aromatic organic groups may be linked by a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

In the first repeating unit of Chemical Formula 1, each $R^2$ is independently —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group.

In the first repeating unit of Chemical Formula 1, the n1 and m1 are independently an integer of 0 to 3.

In the first repeating unit of Chemical Formula 1, each $Y^1$ is the same as or different from each other in each repeating unit, and each independently includes a C6 to C30 aromatic organic group, and the aromatic organic group exists alone, or two or more aromatic organic groups are bonded to each other to form a condensed ring, or two or more aromatic organic groups are linked by a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

Preferably, $Y^1$ may be the divalent organic group represented by the following structural formula:

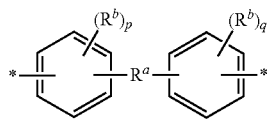

wherein, in the structural formula, each $R^a$ is the same as or different from each other in each repeating unit, and each is independently a single bond, —O—, —S—, —S(=O)$_2$—, —Si(CH$_3$)$_2$—, a C1 to C30 aliphatic organic group, a C3 to C30 alicyclic organic group, a C6 to C30 aromatic organic group, a C2 to C30 heterocyclic group, or a C13 to C20 fluorenyl group;

each $R^b$ is independently —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group; and p and q are independently 1 to 4.

In the first repeating unit of Chemical Formula 1, x is an integer of 2 or more, and each repeating unit which is repeated two or more times by x may be the same as or different from each other.

For example, in case of x=2 in Chemical Formula 1, the $R^1$, $R^2$, n1, m1, and $Y^1$ may be the same as or different from each other in each repeating unit which is repeated x times.

More preferably, x is 2 to 4, 2 to 3, or 2.

In the first repeating unit of Chemical Formula 1, $E^1$, $E^2$, and $E^3$ are independently a single bond, —NH—, or —C(=O)—. Here, the single bond means a case that $E^1$, $E^2$, and $E^3$ are each a chemical bond which simply links the groups on both sides.

In the first repeating unit of Chemical Formula 1, each $Z^1$ is a brancher having three reactive substituents, each is the same as or different from each other in each repeating unit, and each is independently a trivalent linking group derived from at least one compound selected from the group consisting of triacyl halide, tricarboxylic acid, and tricarboxylate.

Specifically, $Z^1$ may be the trivalent linking group derived from at least one compound selected from the group consisting of a C6 to C20 aromatic triacyl halide, a C6 to C20 aromatic tricarboxylic acid, a C6 to C20 aromatic tricarboxylate, a C4 to C20 heteroaromatic triacyl halide containing N, a C4 to C20 heteroaromatic tricarboxylic acid containing N, a C4 to C20 heteroaromatic tricarboxylate containing N, a C6 to C20 alicyclic triacyl halide, a C6 to C20 alicyclic tricarboxylic acid, and a C6 to C20 alicyclic tricarboxylate.

More specifically, $Z^1$ may be selected from the group represented by the following structural formulae.

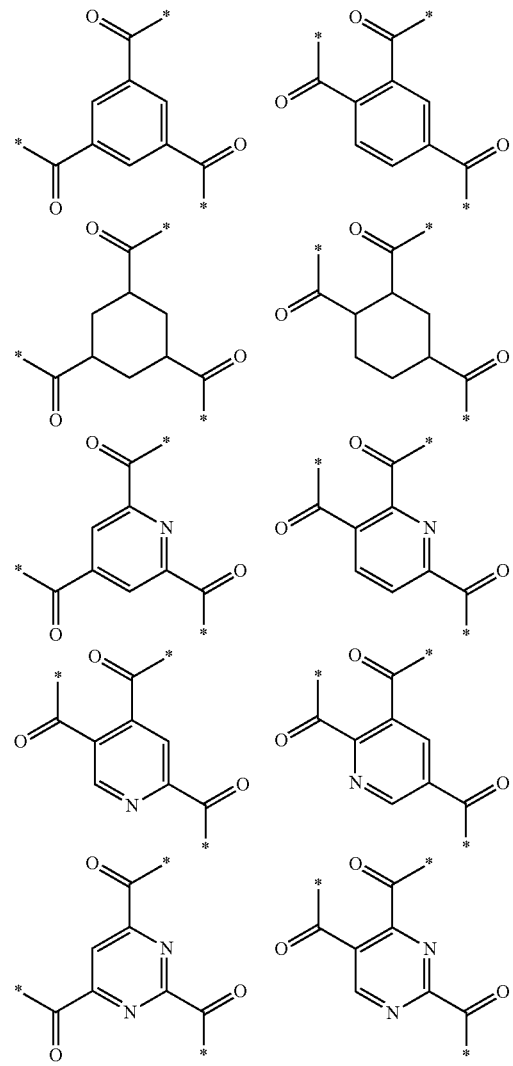

-continued

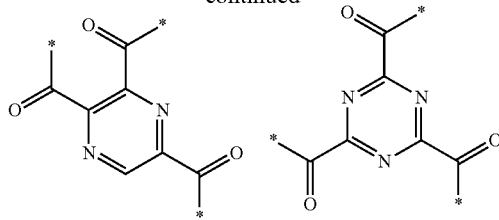

For example, $Z^1$ may be a trivalent linking group derived from at least one compound selected from the group consisting of 1,3,5-benzenetricarbonyl trichloride, 1,2,4-benzenetricarbonyl trichloride, 1,3,5-benzenetricarboxylic acid, 1,2,4-benzenetricarboxylic acid, trimethyl 1,3,5-benzenetricarboxylate, and trimethyl 1,2,4-benzenetricarboxylate.

Preferably, the first repeating unit may include a repeating unit represented by Chemical Formula 3:

[Chemical Formula 3]

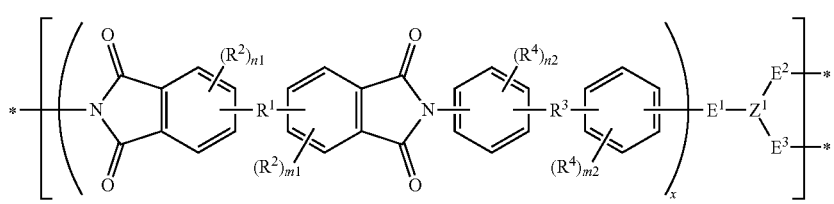

wherein, in Chemical Formula 3, each $R^1$ is the same as or different from each other in each repeating unit, and each is independently a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, —C(=O)NH—, or a C6 to C30 aromatic organic group;

$R^2$ and $R^4$ are is independently —H, —F, —Cl, —Br, —I, —CF$_3$, —CCl$_3$, —CBr$_3$, —CI$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group;

each $R^3$ is the same as or different from each other in each repeating unit, and each is independently a single bond, —O—, —S—, —S(=O)$_2$—, —Si(CH$_3$)$_2$—, a C1 to C30 aliphatic organic group, a C3 to C30 alicyclic organic group, a C6 to C30 aromatic organic group, a C2 to C30 heterocyclic group, or a C13 to C20 fluorenyl group;

each $R^4$ is independently —CF$_3$, —CCl$_3$, —CBr$_3$, —CI$_3$, —F, —Cl, —Br, —I, —NO$_2$, —CN, —COCH$_3$, or —CO$_2$C$_2$H$_5$;

n1 and m1 are independently 0 to 3;

n2 and m2 are independently 1 to 4;

x is an integer of 2 or more, and each repeating unit which is repeated two or more times by x may be the same as or different from each other;

$E^1$, $E^2$, and $E^3$ are independently a single bond, —NH—, or —C(=O)—; and each $Z^1$ is the same as or different from each other in each repeating unit, and each is independently a trivalent linking group derived from at least one compound selected from the group consisting of triacyl halide, tricarboxylic acid, and tricarboxylate.

More preferably, the first repeating unit includes a repeating unit represented by Chemical Formula 5a; and $X^1$ of Chemical Formula 5a is a repeating unit represented by Chemical Formula 5b and $X^2$ is a repeating unit represented by Chemical Formula 5c:

[Chemical Formula 5a]

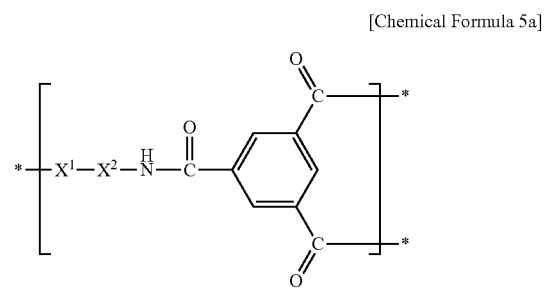

-continued

[Chemical Formula 5b]

[Chemical Formula 5c]

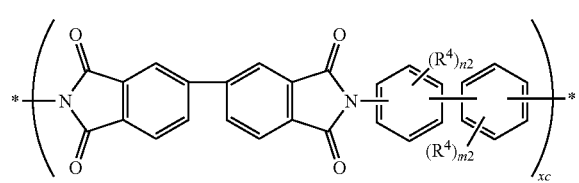

wherein, in Chemical Formulae 5a, 5b, and 5c, each $R^4$ is independently —F, —Cl, —Br, —I, —CF$_3$, —CCl$_3$, —CBr$_3$, —CI$_3$, —NO$_2$, —CN, —COCH$_3$, —CO$_2$C$_2$H$_5$;

n1 and m1 are independently 0 to 3;

n2 and m2 are independently 1 to 4; and xb and xc are independently an integer of 1 or more.

According to the embodiment of the present disclosure, in the first repeating unit, the repeating unit represented by Chemical Formula 5b and the repeating unit represented by Chemical Formula 5c are preferably contained in an equivalent ratio of 1:1.1 to 1:2.0.

That is, in the above embodiment, it is preferable that the repeating unit represented by Chemical Formula 5c is contained in a higher equivalent content than the repeating unit represented by Chemical Formula 5b in the first repeating unit in order to exhibit a sufficient ultraviolet shielding effect required in the present disclosure.

Specifically, the repeating unit represented by Chemical Formula 5b and the repeating unit represented by Chemical Formula 5c are preferably contained in the first repeating unit in an equivalent ratio of 1:1.10 or more, or 1:1.15 or more, 1:1.20 or more, or 1:1.25 or more, and 1:2.00 or less, 1:1.75 or less, 1:1.50 or less, 1:1.45 or less, 1:1.40 or less, 1:1.35 or less, or 1:1.30 or less.

(ii) Second Repeating Unit of Polyimide-Based Block Copolymer

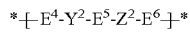  [Chemical Formula 2]

In the polyimide-based block copolymer, at least one repeating unit represented by Chemical Formula 2 may be included.

In the second repeating unit of Chemical Formula 2, each $Y^2$ is the same as or different from each other in each repeating unit, and each independently includes a C6 to C30 aromatic organic group. Here, the aromatic organic group exists alone, or two or more aromatic organic groups are bonded to each other to form a condensed ring, or two or more aromatic organic groups are linked by a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

Preferably, $Y^2$ may be the divalent organic group represented by the following wherein, formula:

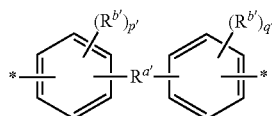

wherein, in the structural formula, each $R^{a'}$ is the same as or different from each other in each repeating unit, and each is independently a single bond, —O—, —S—, —S(=O)$_2$—, —Si(CH$_3$)$_2$—, a C1 to C30 aliphatic organic group, a C3 to C30 alicyclic organic group, a C6 to C30 aromatic organic group, a C2 to C30 heterocyclic group, or a C13 to C20 fluorenyl group;

$R^{b'}$ is independently —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group; and p' and q' are independently 1 to 4.

In the second repeating unit of Chemical Formula 2, $E^4$, $E^5$, and $E^6$ are independently a single bond, —NH—, or —C(=O)—. Here, the single bond means a case that $E^4$, $E^5$, and $E^6$ are each a chemical bond which simply links the groups on both sides.

In the second repeating unit of Chemical Formula 2, each $Z^2$ is the same as or different from each other in each repeating unit, and each independently is a divalent linking group derived from at least one compound selected from the group consisting of diacyl halide, dicarboxylic acid, and dicarboxylate.

Preferably, the $Z^2$ is a divalent linking group of a —C(=O)-A-C(=O)— form.

Here, the A is a C6 to C20 divalent aromatic organic group, a C4 to C20 divalent heteroaromatic organic group, a C6 to C20 divalent alicyclic organic group or a divalent organic group in which two or more of the organic groups are linked by a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

Preferably, the $Z^2$ may be selected from the group represented by the following structural formulae.

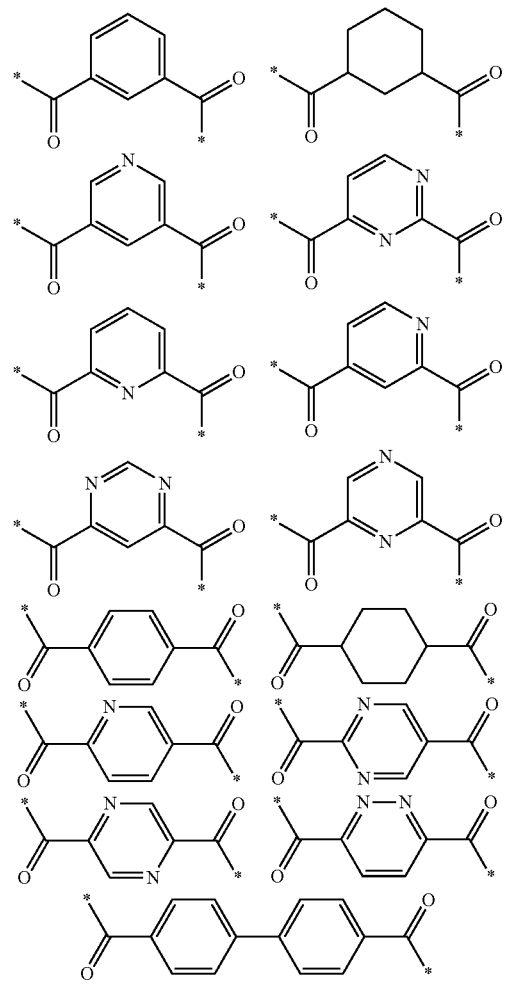

For example, the $Z^2$ may be a divalent linking group derived from at least one compound selected from the group consisting of isophthaloyl dichloride (IPC), isophthalic acid, cyclohexane-1,3-dicarbonyl chloride, cyclohexane-1,3-dicarboxylic acid, pyridine-3,5-dicarbonyl chloride, pyridine-3,5-dicarboxylic acid, pyrimidine-2,6-dicarbonyl chloride, pyrimidine-2,6-dicarboxylic acid, terephthaloyl chloride (TPC), terephthalic acid, cyclohexane-1,4-dicarbonyl chloride, cyclohexane-1,4-dicarboxylic acid, pyridine-2,5-dicarbonyl chloride, pyridine-2,5-dicarboxylic acid, pyrimidine-2,5-dicarbonyl chloride, pyrimidine-2,5-dicarboxylic acid, 4,4'-biphenyldicarbonyl chloride, BPC, and 4,4'-biphenyldicarboxylic acid.

More preferably, the second repeating unit includes a repeating unit containing $Z^2$ having a structure in which two carbonyl groups are bonded at the meta position with respect to the central ring in the above examples, together with a repeating unit containing $Z^2$ having a structure in which two carbonyl groups are bonded at the para position with respect to the central ring to achieve not only processability but also mechanical properties.

As a non-limiting example, when isophthaloyl dichloride and 4,4'-biphenyldicarbonyl chloride are applied to the formation of the second repeating unit, the polyimide-based block copolymer may exhibit not only excellent processability due to the meta position bonding of the carbonyl groups, but also excellent mechanical properties (hardness, modulus, and the like) due to the para bonding of the carbonyl groups.

Preferably, the second repeating unit includes a repeating unit represented by Chemical Formula 4:

[Chemical Formula 4]

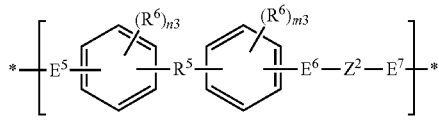

wherein, in Chemical Formula 4, each $R^5$ is the same as or different from each other in each repeating unit, and each is independently a single bond, —O—, —S—, —S(=O)$_2$—, —Si(CH$_3$)$_2$—, a C1 to C30 aliphatic organic group, a C3 to C30 alicyclic organic group, a C6 to C30 aromatic organic group, a C2 to C30 heterocyclic group, or a C13 to C20 fluorenyl group;

each $R^6$ is independently —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group;

n3 and m3 are independently 1 to 4;

$E^5$, $E^6$, and $E^7$ are independently a single bond, —NH—, or —C(=O)—; and each $Z^2$ is the same as or different from each other in each repeating unit, and each is independently a divalent linking group derived from at least one compound selected from the group consisting of diacyl halide, dicarboxylic acid, and dicarboxylate.

More preferably, the second repeating unit includes a repeating unit represented by Chemical Formula 6:

[Chemical Formula 6]

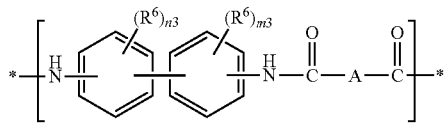

wherein, in Chemical Formula 6, each $R^6$ is independently —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group;

n3 and m3 are independently 1 to 4; and

A is a C6 to C20 divalent aromatic organic group, a C4 to C20 divalent heteroaromatic organic group, a C6 to C20 divalent alicyclic organic group, or a divalent organic group in which two or more of the organic groups are linked by a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

In the polyimide-based block copolymer, a weight ratio of the first repeating unit to the second repeating unit is preferably 1:0.25 to 1:4 in order to exhibit the above-described effect.

Specifically, the weight ratio of the first repeating unit:the second repeating unit may be 1:0.25 or more, 1:0.30 or more, 1:0.35 or more, 1:0.40 or more, 1:0.45 or more, 1:0.50 or more, 1:0.55 or more, 1:0.60 or more, or 1:0.65 or more, and 1:4.0 or less, 1:3.5 or less, 1:3.0 or less, 1:2.5 or less, 1:2.0 or less, or 1:1.5 or less. More preferably, the weight ratio may be 1:0.25 to 1:2, 1:0.25 to 1:1.5, or 1:0.65 to 1:1.5.

As described above, the $Z^1$ introduced into the first repeating unit is a brancher that imparts a network structure to the copolymer. By the block copolymerization of the repeating units containing the brancher, a network having a rigid and stable structure may be formed in the copolymer. Therefore, when the weight ratio of the first repeating unit is too low, the network structure is not sufficiently formed in the copolymer, thereby the effect of improving the physical properties may be insignificant. However, if the weight ratio of the first repeating unit is too high, gelation may occur during the polymerization.

The polyimide-based block copolymer may have a higher molecular weight than a polyimide resin having a general linear structure, due to a strong and stable network structure. Specifically, the polyimide-based block copolymer may have a weight average molecular weight of 100,000 to 5,000,000 g/mol, preferably 200,000 to 1,000,000 g/mol, more preferably 300,000 to 750,000 g/mol, and still more preferably 500,000 to 650,000 g/mol.

The polyimide-based block copolymer may be prepared by a method including the steps of: mixing a compound forming the first repeating unit in an appropriate solvent to initiate a reaction; adding a compound forming the second repeating unit to the reaction mixture and reacting; and adding a compound such as acetic anhydride or pyridine to the reaction mixture to induce a chemical imidization reaction.

The polyimide-based block copolymer may be prepared by low-temperature solution polymerization, interfacial polymerization, melt polymerization, solid phase polymerization, or the like.

The polyimide-based block copolymer film may be prepared by a conventional method such as a dry method or a wet method using the polyimide-based block copolymer.

For example, the polyimide-based block copolymer film may be obtained by coating a solution containing the copolymer on an arbitrary support to form a film, and drying the film by evaporating the solvent from the film. If necessary, stretching and heat treatment for the polyimide-based film may be carried out.

The polyimide-based block copolymer film may exhibit an excellent ultraviolet shielding property while being colorless and transparent, because it is prepared using the polyimide-based block copolymer.

Specifically, the polyimide-based block copolymer including the first repeating unit formed by applying two or more tetracarboxylic acid anhydrides together with a brancher may have a long polymer chain and a stable network compared with the linear type polyimide-based copolymer, thereby exhibiting a significantly improved ultraviolet shielding property.

For example, the polyimide-based block copolymer film may exhibit transmittance of 13% or less, 10 to 13%, 10 to 12.5%, or 12 to 13% with respect to ultraviolet light having a wavelength of 388 nm at a thickness of 50±5 μm.

As a result, the polyimide-based block copolymer film can be suitably used as a base material for devices and apparatuses which require colorless transparency as well as an excellent ultraviolet shielding property. For example, such a polyimide-based block copolymer film can be suitably used for substrates for displays, protective films for displays, touch panels, and the like, and especially various foldable devices and apparatuses.

Advantageous Effects

As the polyimide-based block copolymer film according to the present disclosure exhibits an excellent ultraviolet shielding property, it can be suitably used for substrates for displays, protective films for displays, touch panels, and the like.

(trifluoromethyl)benzidine, 1.01 eq. of terephthaloyl chloride (TPC), and 120 ml of dimethylacetamide were added thereto, and the reaction was initiated under a nitrogen atmosphere at room temperature.

After forming the polyamic acid polymer by reaction for 4 hours, 14 mL (10 eq., 0.15 mol) of acetic anhydride and 12 mL (10 eq., 0.15 mol) of pyridine were added to the reaction mixture, and the mixture was stirred in an oil bath at 40° C. for 15 hours to carry out the chemical imidization reaction.

After completion of the reaction, the mixture was precipitated with water and ethanol to obtain a polyimide-based block copolymer having the following repeating units (with a weight average molecular weight of 490,000 g/mol, and a ratio of the first repeating unit to the second repeating unit of 1:1).

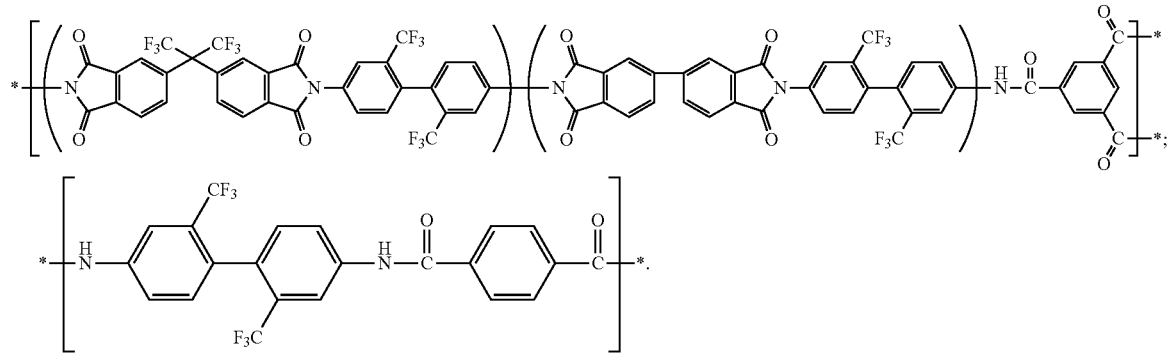

BRIEF DESCRIPTION OF THE DRAWINGS

FIG. 1 is an NMR spectrum of the polyimide-based copolymer obtained in Example 1.

FIG. 2 is a graph showing the measurement results of the total light transmittance of the polyimide-based films according to Example 4 and Comparative Example 2.

FIG. 3 is a graph showing the measurement results of the total light transmittance of the polyimide-based films according to Example 5, Comparative Example 2, and Reference Example 2.

DETAILED DESCRIPTION OF THE EMBODIMENTS

Hereinafter, preferred examples are provided for better understanding. However, these examples are for illustrative purposes only, and the invention is not intended to be limited by these examples.

Example 1

1.01 eq. of 2,2'-bis(trifluoromethyl)benzidine; 0.3275 eq. of 4,4'-(hexafluoroisopropylidene)diphthalic anhydride (6FDA); 0.655 eq. of 4,4'-biphthalic anhydride (BPDA); 0.005 eq. of benzene-1,3,5-tricarbonyl trichloride; and 14 wt % of dimethylacetamide were placed to a 250 mL round flask equipped with a Dean-Stark apparatus and a condenser, and the reaction was initiated at room temperature. The reaction mixture was stirred at 0° C. using ice water under a nitrogen atmosphere.

After 4 hours, the reaction product was taken out and allowed to return to room temperature, 0.99 eq. of 2,2'-bis $^1$H NMR (DMSO-d6, TMS as standard material) δ (ppm): 10.818 (s), 8.534 (s), 8.460 (s), 8.379 (s), 8.266 (d), 8.169 (s), 8.104 (d), 7.941 (d), 7.798 (s), 7.708 (s), 7.416 (s)

Example 2

1.01 eq. of 2,2'-bis(trifluoromethyl)benzidine; 0.4323 eq. of 4,4'-(hexafluoroisopropylidene)diphthalic anhydride (6FDA); 0.5502 eq. of 4,4'-biphthalic anhydride (BPDA); 0.005 eq. of benzene-1,3,5-tricarbonyl trichloride; and 14 wt % of dimethylacetamide were placed to a 250 mL round flask equipped with a Dean-Stark apparatus and a condenser, and the reaction was initiated at room temperature. The reaction mixture was stirred at 0° C. using ice water under a nitrogen atmosphere.

After 4 hours, the reaction product was taken out and allowed to return to room temperature, 0.99 eq. of 2,2'-bis (trifluoromethyl)benzidine, 1.01 eq. of terephthaloyl chloride (TPC), and 120 ml of dimethylacetamide were added thereto, and the reaction was initiated under a nitrogen atmosphere at room temperature.

After forming the polyamic acid polymer by reaction for 4 hours, 14 mL (10 eq., 0.15 mol) of acetic anhydride and 12 mL (10 eq., 0.15 mol) of pyridine were added to the reaction mixture, and the mixture was stirred in an oil bath at 40° C. for 15 hours to carry out the chemical imidization reaction.

After completion of the reaction, the mixture was precipitated with water and ethanol to obtain a polyimide-based block copolymer having the same repeating units as in Example 1 (with a weight average molecular weight of 490,000 g/mol, and a ratio of the first repeating unit to the second repeating unit of 1:1).

Example 3

1.01 eq. of 2,2'-bis(trifluoromethyl)benzidine; 0.3275 eq. of 4,4'-(hexafluoroisopropylidene)diphthalic anhydride (6FDA); 0.655 eq. of 4,4'-biphthalic anhydride (BPDA); 0.005 eq. of benzene-1,3,5-tricarbonyl trichloride; and 14 wt % of dimethylacetamide were placed to a 250 mL round flask equipped with a Dean-Stark apparatus and a condenser, and the reaction was initiated at room temperature. The reaction mixture was stirred at 0° C. using ice water under a nitrogen atmosphere.

After 4 hours, the reaction product was taken out and allowed to return to room temperature, 0.99 eq. of 2,2'-bis (trifluoromethyl)benzidine, 0.5 eq. of isophthaloyl dichloride (IPC), 0.5 eq. of 4,4'-biphenyldicarbonyl chloride (BPC), and 120 ml of dimethylacetamide were added thereto, and the reaction was initiated under a nitrogen atmosphere at room temperature.

After forming the polyamic acid polymer by reaction for 4 hours, 14 mL (10 eq., 0.15 mol) of acetic anhydride and 12 mL (10 eq., 0.15 mol) of pyridine were added to the reaction mixture, and the mixture was stirred in an oil bath at 40° C. for 15 hours to carry out the chemical imidization reaction.

After completion of the reaction, the mixture was precipitated with water and ethanol to obtain a polyimide-based block copolymer having the following repeating units (with a weight average molecular weight of 490,000 g/mol, and a ratio of the first repeating unit to the second repeating unit of 1:1).

and the reaction was initiated at room temperature. The reaction mixture was stirred at 0° C. using ice water under a nitrogen atmosphere.

After 4 hours, the reaction product was taken out and allowed to return to room temperature, 0.99 eq. of 2,2'-bis (trifluoromethyl)benzidine, 1.01 eq. of terephthaloyl chloride, and 120 ml of dimethylacetamide were added thereto, and the reaction was initiated under a nitrogen atmosphere at room temperature.

After forming the polyamic acid polymer by reaction for 4 hours, 14 mL (10 eq., 0.15 mol) of acetic anhydride and 12 mL (10 eq., 0.15 mol) of pyridine were added to the reaction mixture, and the mixture was stirred in an oil bath at 40° C. for 15 hours to carry out the chemical imidization reaction.

After completion of the reaction, the mixture was precipitated with water and ethanol to obtain a polyimide-based block copolymer having the same repeating units as in Example 1 with a (weight average molecular weight of 490,000 g/mol).

Example 4

A film was prepared using the polyimide-based copolymer obtained in Example 1. Specifically, the polyimide-based copolymer was dissolved in dimethylacetamide to prepare a polymer solution of about 25% (w/V). The polymer solution was poured on a glass plate, the thickness of the polymer solution was uniformly adjusted using a film applicator, and was dried in a vacuum oven at 100° C. for 12 hours or more to obtain a polyimide-based film.

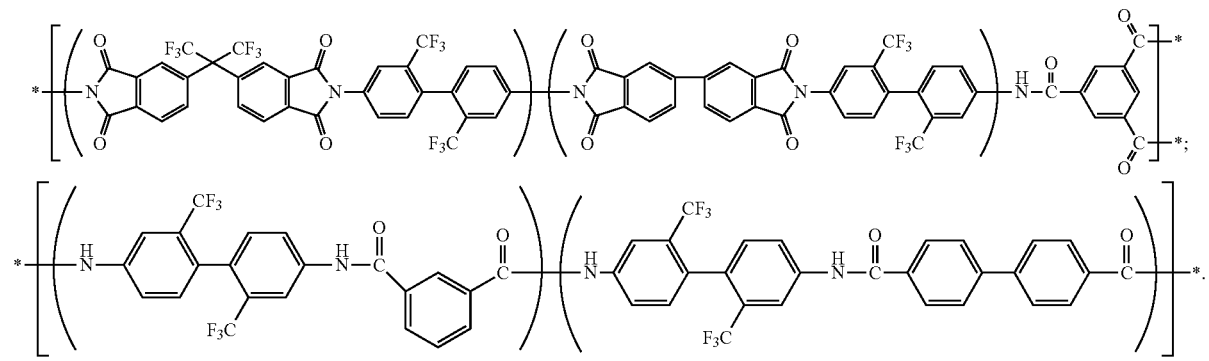

Comparative Example 1

A polyimide-based copolymer (with a weight average molecular weight of 160,000 g/mol, and a ratio of the first repeating unit to the second repeating unit of 1:1) was obtained in the same manner as in Example 1, except that the 4,4'-biphthalic anhydride (BPDA) was not used.

Reference Example 1

1.01 eq. of 2,2'-bis(trifluoromethyl)benzidine; 0.49125 eq. of 4,4'-(hexafluoroisopropylidene)diphthalic anhydride (6FDA); 0.49125 eq. of 4,4'-biphthalic anhydride (BPDA); 0.005 eq. of benzene-1,3,5-tricarbonyl trichloride; and 14 wt % of dimethylacetamide were placed to a 250 mL round flask equipped with a Dean-Stark apparatus and a condenser, Example 5

A polyimide-based film having a thickness of 50 μm was obtained in the same manner as in Example 4, except that the polyimide-based copolymer obtained in Example 2 was used in place of the copolymer obtained in Example 1.

Example 6

A polyimide-based film having a thickness of 50 μm was obtained in the same manner as in Example 4, except that the polyimide-based copolymer obtained in Example 3 was used in place of the copolymer obtained in Example 1.

Comparative Example 2

A polyimide-based film having a thickness of 50 μm was obtained in the same manner as in Example 4, except that the polyimide-based copolymer obtained in Comparative Example 1 was used in place of the copolymer obtained in Example 1.

Reference Example 2

A polyimide-based film having a thickness of 50 μm was obtained in the same manner as in Example 4, except that the polyimide-based copolymer obtained in Reference Example 1 was used in place of the copolymer obtained in Example 1.

EXPERIMENTAL EXAMPLES

The total light transmittance of the films according to the examples and comparative examples was measured using a UV-VIS-NIR spectrophotometer (SolidSpec-3700, SHIMADZU).

The measurement results of the total light transmittance of the films of Example 4 and Comparative Example 2 are shown in FIG. 2.

The measurement results of the total light transmittance of the films of Example 5, Comparative Example 2, and Reference Example 2 are shown in FIG. 3.

In addition, the transmittance values of the films of Example 4, Example 5, and Comparative Example 2 with respect to ultraviolet light having a wavelength of 388 nm are shown in Table 1 below.

TABLE 1

|  | Example 4 | Example 5 | Comparative Example 2 |
|---|---|---|---|
| Transmittance (%, @ 388 nm) | 12.10 | 11.09 | 82.58 |

Referring to Table 1, it was confirmed that the films according to the above examples exhibit a remarkably excellent ultraviolet shielding property compared with the film of Comparative Example 2.

In addition, referring to FIG. 3, it was confirmed that the film according to Reference Example 2 had a transmittance value of 38.92% with respect to ultraviolet light having a wavelength of 388 nm. Thus, it was confirmed that its ultraviolet shielding property was worse than that of the films of the above examples.

The invention claimed is:

1. A polyimide-based block copolymer film including
a first repeating unit represented by Chemical Formula 1 and a second repeating unit represented by Chemical Formula 2,
wherein transmittance is 13% or less with respect to ultraviolet light having a wavelength of 388 nm at a thickness of 50±5 μm:

[Chemical Formula 1]

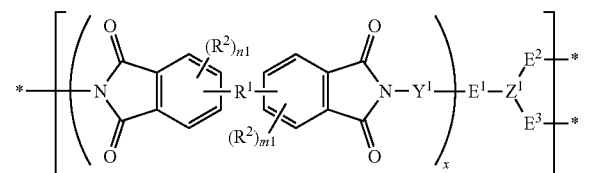

wherein, in Chemical Formula 1,
each $R^1$ is the same as or different from each other in each repeating unit, and each is independently a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, —C(=O)NH—, or a C6 to C30 aromatic organic group;

each $R^2$ is independently —H, —F, —Cl, —Br, —I, —CF$_3$, —CCl$_3$, —CBr$_3$, —CI$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group;

n1 and m1 are independently 0 to 3;

each $Y^1$ is the same as or different from each other in each repeating unit, and each independently comprises a C6 to C30 aromatic organic group, and the aromatic organic group exists alone, or two or more aromatic organic groups are bonded to each other to form a condensed ring, or two or more aromatic organic groups are linked by a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—;

x is an integer of 2 or more, and each repeating unit which is repeated two or more times by x may be the same as or different from each other;

$E^1$, $E^2$, and $E^3$ are independently a single bond, —NH—, or —C(=O)—; and each $Z^1$ is the same as or different from each other in each repeating unit, and each is independently a trivalent linking group derived from at least one compound selected from the group consisting of triacyl halide, tricarboxylic acid, and tricarboxylate;

*—[—E$^4$-Y$^2$-E$^5$-Z$^2$-E$^6$—]—* [Chemical Formula 2]

wherein, in Chemical Formula 2, each $Y^2$ is the same as or different from each other in each repeating unit, and each independently comprises a C6 to C30 aromatic organic group, and the aromatic organic group exists alone, or two or more aromatic organic groups are bonded to each other to form a condensed ring, or two or more aromatic organic groups are linked by a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—;

$E^4$, $E^5$, and $E^6$ are independently a single bond, —NH—, or —C(=O)—; and each $Z^2$ is the same as or different from each other in each repeating unit, and each is independently a divalent linking group derived from at least one compound selected from the group consisting of diacyl halide, dicarboxylic acid, and dicarboxylate.

2. The polyimide-based block copolymer film of claim 1, wherein the first repeating unit comprises a repeating unit represented by Chemical Formula 3:

[Chemical Formula 3]

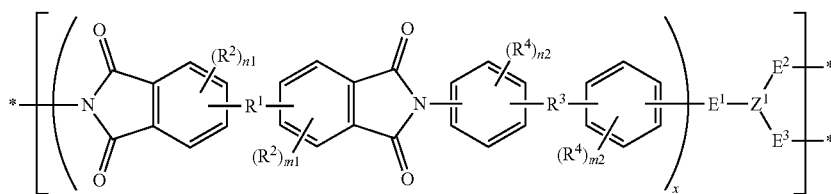

wherein, in Chemical Formula 3, each $R^1$ is the same as or different from each other in each repeating unit, and each is independently a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, —C(=O)NH—, or a C6 to C30 aromatic organic group;

$R^2$ is independently —H, —F, —Cl, —Br, —I, —CF$_3$, —CCl$_3$, —CBr$_3$, —CI$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group;

each $R^3$ is the same as or different from each other in each repeating unit, and each is independently a single bond, —O—, —S—, —S(=O)$_2$—, —Si(CH$_3$)$_2$—, a C1 to C30 aliphatic organic group, a C3 to C30 alicyclic organic group, a C6 to C30 aromatic organic group, a C2 to C30 heterocyclic group, or a C13 to C20 fluorenyl group;

each $R^4$ is independently —CF$_3$, —CCl$_3$, —CBr$_3$, —CI$_3$, —F, —Cl, —Br, —I, —NO$_2$, —CN, —COCH$_3$, or —CO$_2$C$_2$H$_5$;

n1 and m1 are independently 0 to 3;

n2 and m2 are independently 1 to 4;

x is an integer of 2 or more, and each repeating unit which is repeated two or more times by x may be the same as or different from each other;

$E^1$, $E^2$, and $E^3$ are independently a single bond, —NH—, or —C(=O)—; and each $Z^1$ is the same as or different from each other in each repeating unit, and each is independently a trivalent linking group derived from at least one compound selected from the group consisting of triacyl halide, tricarboxylic acid, and tricarboxylate.

3. The polyimide-based block copolymer film of claim 1, wherein the second repeating unit comprises a repeating unit represented by Chemical Formula 4:

[Chemical Formula 4]

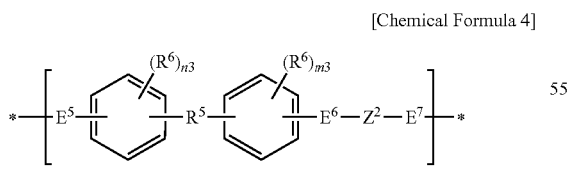

wherein, in Chemical Formula 4, each $R^5$ is the same as or different from each other in each repeating unit, and each is independently a single bond, —O—, —S—, —S(=O)$_2$—, —Si(CH$_3$)$_2$—, a C1 to C30 aliphatic organic group, a C3 to C30 alicyclic organic group, a C6 to C30 aromatic organic group, a C2 to C30 heterocyclic group, or a C13 to C20 fluorenyl group;

each $R^6$ is independently —H, —F, —Cl, —Br, —I, —CF$_3$, —CCl$_3$, —CBr$_3$, —CI$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group;

n3 and m3 are independently 1 to 4;

$E^5$, and $E^6$, and $E^7$ are independently a single bond, —NH—, or —C(=O)—; and each $Z^2$ is the same as or different from each other in each repeating unit, and each is independently a divalent linking group derived from at least one compound selected from the group consisting of diacyl halide, dicarboxylic acid, and dicarboxylate.

4. The polyimide-based block copolymer film of claim 1, wherein $Z^1$ is a trivalent linking group derived from at least one compound selected from the group consisting of 1,3,5-benzenetricarbonyl trichloride, 1,2,4-benzenetricarbonyl trichloride, 1,3,5-benzenetricarboxylic acid, 1,2,4-benzenetricarboxylic acid, trimethyl 1,3,5-benzenetricarboxylate, and trimethyl 1,2,4-benzenetricarboxylate; and $Z^2$ is a divalent linking group derived from at least one compound selected from the group consisting of isophthaloyl dichloride (IPC), isophthalic acid, cyclohexane-1,3-dicarbonyl chloride, cyclohexane-1,3-dicarboxylic acid, pyridine-3,5-dicarbonyl chloride, pyridine-3,5-dicarboxylic acid, pyrimidine-2,6-dicarbonyl chloride, pyrimidine-2,6-dicarboxylic acid, terephthaloyl chloride (TPC), terephthalic acid, cyclohexane-1,4-dicarbonyl chloride, cyclohexane-1,4-dicarboxylic acid, pyridine-2,5-dicarbonyl chloride, pyridine-2,5-dicarboxylic acid, pyrimidine-2,5-dicarbonyl chloride, pyrimidine-2,5-dicarboxylic acid, 4,4'-biphenyldicarbonyl chloride (BPC), and 4,4'-biphenyldicarboxylic acid.

5. The polyimide-based block copolymer film of claim 1, wherein the first repeating unit comprises a repeating unit represented by Chemical Formula 5a, and $X^1$ of Chemical Formula 5a is a repeating unit represented by Chemical Formula 5b and $X^2$ is a repeating unit represented by Chemical Formula 5c:

[Chemical Formula 5a]

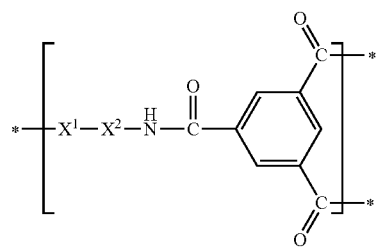

-continued

[Chemical Formula 5b]

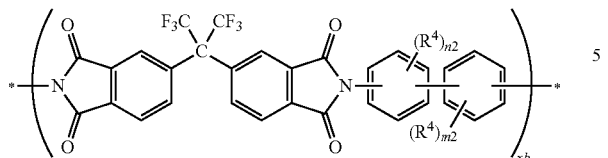

[Chemical Formula 5c]

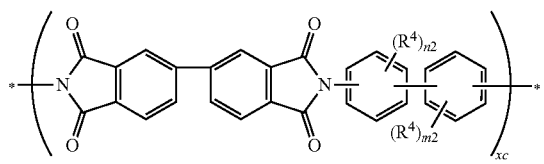

wherein, in Chemical Formulae 5a, 5b, and 5c,
each $R^4$ is independently —F, —Cl, —Br, —I, —$CF_3$, —$CCl_3$, —$CBr_3$, —$CI_3$, —$NO_2$, —CN, —$COCH_3$, or —$CO_2C_2H_5$;
n2 and m2 are independently 1 to 4; and
xb and xc are independently an integer of 1 or more.

6. The polyimide-based block copolymer film of claim 5, wherein an equivalent ratio of the repeating unit represented by Chemical Formula 5b and the repeating unit represented by Chemical Formula 5c is 1:1.1 to 1:2.0.

7. The polyimide-based block copolymer film of claim 1, wherein the second repeating unit comprises a repeating unit represented by Chemical Formula 6:

[Chemical Formula 6]

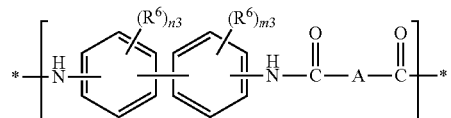

wherein, in Chemical Formula 6,
each $R^6$ is independently —H, —F, —Cl, —Br, —I, —$CF_3$, —$CCl_3$, —$CBr_3$, —$CI_3$, —$NO_2$, —CN, —$COCH_3$, —$CO_2C_2H_5$, a silyl group containing three C1 to C10 aliphatic organic groups, a C1 to C10 aliphatic organic group, or a C6 to C20 aromatic organic group;
n3 and m3 are independently 1 to 4; and
A is a C6 to C20 divalent aromatic organic group, a C4 to C20 divalent heteroaromatic organic group, a C6 to C20 divalent alicyclic organic group, or a divalent organic group in which two or more of the organic groups are linked by a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

8. The polyimide-based block copolymer film of claim 1, wherein a weight ratio of the first repeating unit to the second repeating unit is 1:0.25 to 1:4.

9. The polyimide-based block copolymer film of claim 1, wherein a weight average molecular weight of the polyimide-based block copolymer is 100,000 to 5,000,000 g/mol.

* * * * *